US009985805B1

(12) United States Patent
Swenholt et al.

(10) Patent No.: US 9,985,805 B1
(45) Date of Patent: May 29, 2018

(54) ADAPTIVE FILTER WITH RECURSIVE PROCESSING

(71) Applicant: Rockwell Collins, Inc., Cedar Rapids, IA (US)

(72) Inventors: Mark P. Swenholt, Plano, TX (US); Jeffrey L. Box, Murphy, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days. days.

(21) Appl. No.: 15/648,256

(22) Filed: Jul. 12, 2017

(51) Int. Cl.
*H04L 25/03* (2006.01)
*H04B 1/00* (2006.01)

(52) U.S. Cl.
CPC ..... *H04L 25/03057* (2013.01); *H04B 1/0017* (2013.01); *H04L 2025/03522* (2013.01)

(58) Field of Classification Search
CPC ..... H04L 2025/03522; H04L 25/03057; H04L 25/03019; H04L 27/2334; H04L 27/148; H04B 1/0017
See application file for complete search history.

(56) References Cited

U.S. PATENT DOCUMENTS

| 2009/0252263 | A1* | 10/2009 | Liu | H04B 7/01 375/344 |
| 2014/0064419 | A1* | 3/2014 | Arambepola | H04L 27/265 375/349 |
| 2015/0051880 | A1* | 2/2015 | Arditti Ilitzky | G06F 17/5009 703/2 |

* cited by examiner

*Primary Examiner* — Jean B Corrielus
(74) *Attorney, Agent, or Firm* — Angel N. Gerdzhikov; Donna P. Suchy; Daniel M. Barbieri

(57) ABSTRACT

An adaptive recursive filter is disclosed. The filter includes a filtering device to iteratively apply a recursive filter to signal frames corresponding to portions of a sampled broadband signal. Each iteration of the recursive filter may include generating an autocorrelation signal of an input signal frame, calculating a ratio of a magnitudes of a pair of successive points of the autocorrelation signal, comparing the ratio to a selected signal detection threshold such that a value of the ratio greater than a threshold indicates at least one signal of interest, calculating an energy-weighted average frequency of the input signal frame as a frequency of interest, comparing a spectral energy of the input signal frame at the frequency of interest to spectral energies of surrounding frequencies to identify a frequency of a narrowband interference signal, and filtering the input signal frame at the identified frequency to remove the identified narrowband interference signal.

20 Claims, 7 Drawing Sheets

ADAPTIVE FILTER WITH RECURSIVE PROCESSING

BACKGROUND

Broadband (spread-spectrum) radio frequency (RF) signals may be susceptible to narrowband interference signals that may increase the error rate when decoding transmitted data or potentially jam the broadband signal. In this regard, strong continuous-wave (CW) or slowly-modulated signals having a frequency band smaller than the broadband signal may have sufficient power spectral density (PSD) to disrupt the reception and decoding of the broadband RF signal. As an illustrative example, long-distance ultra-low-frequency (ULF) communication may be susceptible to ground station antennas generating intentional or unintentional narrowband signals that may interfere with broadband ULF signals. Further, characteristics such as the frequency bands, the signal strength, or the number of narrowband interference signals are often unknown to the receiver of the broadband signal, which may present challenges for designing systems to mitigate the impact of the narrowband signals.

SUMMARY

In one aspect, embodiments of the inventive concepts disclosed herein are directed to an adaptive filter for recursively filtering interference signals. The adaptive filter may include a filtering device to apply one or more iterations of a recursive filter to each of multiple signal frames corresponding to portions of a broadband signal to remove narrowband interference signals. An iteration of the recursive filter may include generating an autocorrelation signal of an input signal frame representative of the input signal frame correlated with itself. An iteration of the recursive filter may further include calculating a ratio of a magnitude of a first point of the autocorrelation signal to a magnitude of a second point of the autocorrelation signal. An iteration of the recursive filter may further include comparing the ratio to a selected signal detection threshold such that a value of the ratio greater than a selected signal detection threshold is indicative of one or more narrowband interference signals within the input signal frame. An iteration of the recursive filter may further include identifying, for comparisons in which the ratio is greater than the selected signal detection threshold, a frequency of one of the one or more narrowband interference signals. An iteration of the recursive filter may further include filtering, for comparisons in which the ratio is greater than the selected signal detection threshold, the input signal frame at the identified frequency to remove the identified narrowband interference signal.

In a further aspect, embodiments of the inventive concepts disclosed herein are directed to a system for recursively filtering interference signals. The system may include an antenna, an analog-to-digital (A/D) converter to receive a broadband signal from the antenna and sample the broadband signal within a specified latency period, and a filtering device to apply one or more iterations of a recursive filter to each of multiple signal frames corresponding to portions of a sampled signal to remove narrowband interference signals. An iteration of the recursive filter may include generating an autocorrelation signal of an input signal frame representative of the input signal frame correlated with itself. An iteration of the recursive filter may further include calculating a ratio of a magnitude of a first point of the autocorrelation signal to a magnitude of a second point of the autocorrelation signal. An iteration of the recursive filter may further include comparing the ratio to a selected signal detection threshold such that a value of the ratio greater than a selected signal detection threshold is indicative of one or more narrowband interference signals within the input signal frame. An iteration of the recursive filter may further include identifying, for comparisons in which the ratio is greater than the selected signal detection threshold, a frequency of one of the one or more narrowband interference signals. An iteration of the recursive filter may further include filtering, for comparisons in which the ratio is greater than the selected signal detection threshold, the input signal frame at the identified frequency to remove the identified narrowband interference signal.

In a further aspect, embodiments of the inventive concepts disclosed herein are directed to a method for recursively filtering interference signals. The method may include generating an autocorrelation signal of a signal frame representative of the signal frame correlated with itself in which the signal frame is a portion of a sampled broadband signal received by an antenna. The method may further include calculating a ratio of a magnitude of a first point of the autocorrelation signal to a magnitude of a second point of the autocorrelation signal. The method may further include comparing the ratio to a selected signal detection threshold such that a value of the ratio greater than a selected signal detection threshold is indicative of one or more narrowband interference signals within the signal frame. The method may further include identifying, for comparisons in which the ratio is greater than the selected signal detection threshold, a frequency of one of the one or more narrowband interference signals. The method may further include filtering, for comparisons in which the ratio is greater than the selected signal detection threshold, the signal frame at the identified frequency to remove the narrowband interference signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
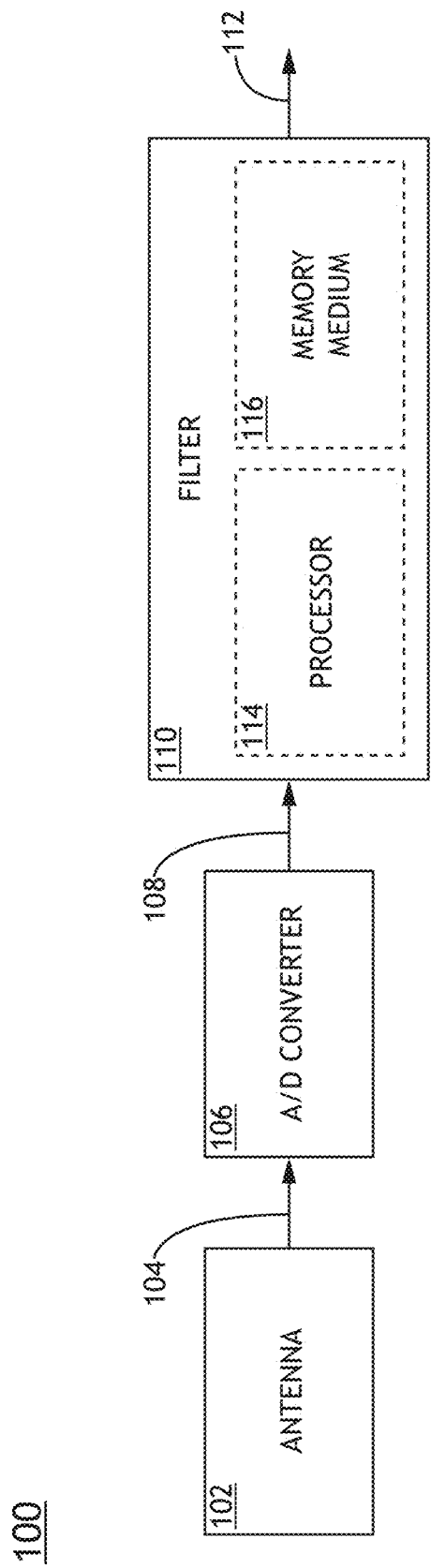
FIG. 1 is a block diagram depicting an exemplary RF system with an adaptive recursive filter configured in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to adaptively filtering narrowband interference signals from a broadband (e.g. spread-spectrum) signal through recursive processing. In some embodiments, an adaptive filter identifies the presence of narrowband interference signals in an input signal and recursively filters out identified narrowband signals from the signal to provide a filtered signal. For example, the adaptive filter may identify the present of narrowband interference signals by sampling the input signal, splitting the input signal into frames having a selected number of samples, performing an autocorrelation of each signal frame, and analyzing the signal frame in the autocorrelation domain. In this regard, the adaptive filter may identify the presence of one or more narrowband interference signals having unknown frequency values or signal strengths. The adaptive filter may then recursively filter out (e.g. mathematically remove the energy of) the narrowband interference signals through multiple iterations. Further, an adaptive filter may utilize allowable latency to perform recursive processing on each signal frame within a specified latency period to provide a filtered signal within a latency constraint. Accordingly, an adaptive filter may execute any number of recursive iterations within the latency constraint to filter multiple narrowband interference signals with initially unknown characteristics from the input interest.

An adaptive filter designed in accordance with inventive concepts disclosed herein may filter narrowband interference signals from any type of signal using broadband modulation and is not limited to any spectral band. A broadband signal may include data modulated with any modulation scheme such that the signal has a broad bandwidth of frequency content. For example, the signal may be, but is not required to be, a minimum shift keyed (MSK) signal. Further, the transmitted bandwidth may be significantly larger than a baseband bandwidth or a minimum channel bandwidth for the data.

Narrowband interference signals that may be filtered from a broadband signal by an adaptive recursive filter designed in accordance with inventive concepts disclosed herein may include any signal having a spectrum that is narrow relative to the spectrum of the broadband signal. For example, narrowband interference signals may include any number of CW signals. By way of another example, narrowband interference signals may include slowly-modulated signals having a narrow spectrum relative to the spectrum of the broadband signal (e.g. over a sampled time interval of tens of milliseconds).

Referring now to FIG. 1, a block diagram depicting an exemplary RF system 100 with an adaptive recursive filter configured in accordance with an embodiment of the inventive concepts disclosed herein is shown. The RF system 100 includes an antenna 102 for receiving an input signal 104, an analog-to-digital (A/D) converter 106 to digitize the input signal 104 to generate a sampled signal 108, and an adaptive filter 110 for recursively identifying and removing narrowband interference signals from the sampled signal 108 to generate a filtered signal 112.

The antenna 102 may be any type of antenna suitable for receiving broadband RF signals. For example, the antenna 102 may include, but is not limited to, a low frequency antenna (e.g. an ultra-low frequency (ULF) antenna) suitable for receiving broadband RF signals across long distances. Further, the antenna 102 may be, but is not required to be, suitable for mounting to an aerial vehicle.

The A/D converter 106 may be any type of A/D converter suitable for digitizing the input signal 104. For example, the A/D converter 106 may receive an analog version of the input signal 104 from the antenna 102 and generate a series of sampled data points as the sampled signal 108. In this regard, the A/D converter 106 may sample the input signal 104 at any selected sampling period. For example, the sampling period may be selected to be sufficiently small to sample the frequency ranges associated with the input signal 104 without aliasing. Further, the A/D converter 106 may sample the input signal 104 with any resolution (e.g. a 16 bit, 32 bit, or 64 bit resolution).

The adaptive filter 110 includes one or more processors 114 configured to execute program instructions maintained on a memory medium 116. In this regard, the one or more processors 114 of the adaptive filter 110 may execute any of the various process steps described throughout the present disclosure.

The one or more processors 114 of the adaptive filter 110 may include any processing element known in the art. In this sense, the one or more processors 114 may include any microprocessor-type computing element configured to execute algorithms and/or instructions. In one embodiment, the one or more processors 114 may consist of a digital signal processor, desktop computer, mainframe computer system, workstation, image computer, parallel processor, or any other computer system (e.g., networked computer) configured to execute a program configured to operate the RF system 100, as described throughout the present disclosure. It is further recognized that the term "processor" may be broadly defined to encompass any device having one or more processing elements, which execute program instructions from a non-transitory memory medium 116. Additionally, the adaptive filter 110 may include one or more components housed in a common housing or within multiple housings. In this way, any computing element or combination of computing elements may be separately packaged as a module suitable for integration into the adaptive filter 110.

The memory medium 116 may include any storage medium known in the art suitable for storing program instructions executable by the associated one or more processors 114. For example, the memory medium 116 may include a non-transitory memory medium. By way of another example, the memory medium 116 may include, but is not limited to, a read-only memory, a random access memory, a magnetic or optical memory device (e.g., disk), a magnetic tape, a solid state drive and the like. It is further noted that memory medium 116 may be housed in a common housing with the one or more processors 114. Therefore, the above description should not be interpreted as merely an illustration of the inventive concepts disclosed herein.

It is to be understood that the RF system 100 may be implemented in various manners without departing from the broad scope of the inventive concepts disclosed herein. For example, the A/D converter 106 may be integrated with the adaptive filter 110 (e.g. on a common platform) rather than as a discrete element as illustrated in FIG. 1. Accordingly, the particular elements associated with the RF system 100 illustrated in FIG. 1 are provided solely for illustrative purposes and should not be interpreted as limiting.

Figure 2:
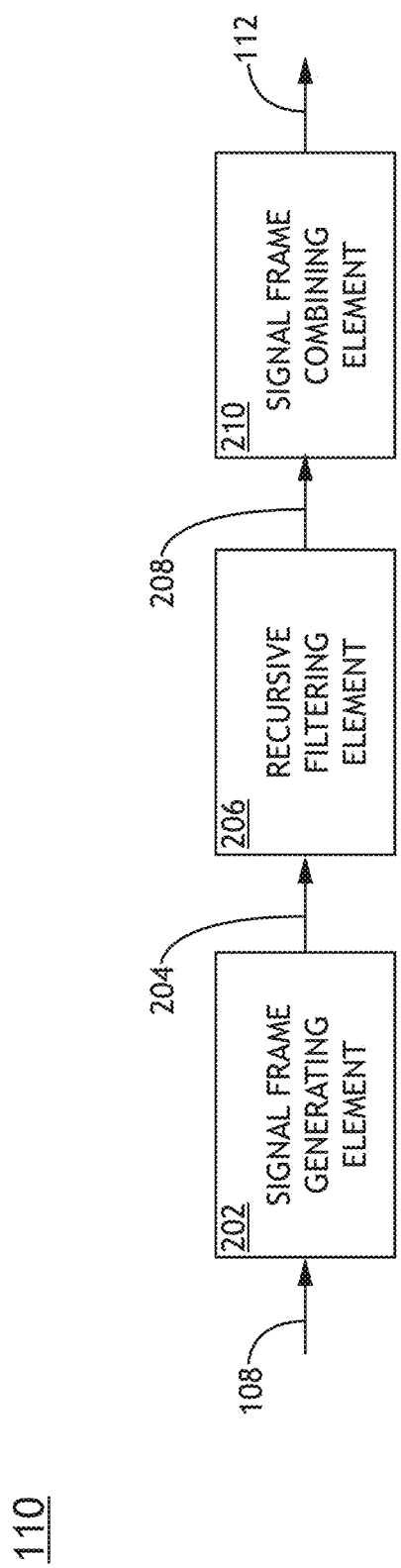
FIG. 2 is a block diagram of an adaptive filter configured in accordance with an embodiment of the inventive concepts disclosed herein.

Referring now to FIG. 2, a block diagram of an adaptive filter 110 configured in accordance with an embodiment of the inventive concepts disclosed herein is shown. The adaptive filter 110 includes a signal frame generating element 202 to divide the sampled signal 108 into signal frames 204 including a selected number of sampled points from the sampled signal 108, a recursive filtering element 206 to recursively filter narrowband interference signals from each frame to provide filtered signal frames 208, and a signal frame combiner element 210 to recombine the filtered signal frames 208 as the filtered signal 112.

In some embodiments, the adaptive filter 110 may provide the filtered signal 112 within a selected latency constraint (e.g. a time lag between reception of a portion of the input signal 104 and the production of a corresponding portion of the filtered signal 112). It is contemplated herein that different applications may allow for greater latency than others (e.g. ranging from the order of milliseconds to minutes). Consequently, the adaptive filter 110 may be configured to operate within any selected latency constraint suitable for a particular application. In some embodiments, the adaptive filter 110 may dynamically adapt to operate within a dynamically varying latency constraint.

The signal frame generating element 202 may generate signal frames 204 having any number of points (e.g. 32 points, 64 points, or 128 points). It is contemplated herein that the number of points in a signal frame 204 may be selected to provide a desired level of filtering performance and processing time. For example, it may be beneficial to have a sufficient number of sampled points such that the filtering operation (e.g. removing narrowband interference signals) does not significantly impact the remaining signal. However, the number of sampled points per frame may also impact the processing time associated with each iteration of the recursive filtering element 206 and thus the possible number of allowable iterations that may be performed within the selected latency constraint.

In some embodiments, the recursive filtering element 206 filters narrowband interference signals from each signal frame 204 through one or more iterations within the selected latency constraint. Accordingly, it may be the case that the number of iterations required to filter a particular signal frame 204 may vary from one frame to the next. In this regard, the recursive filtering element 206 may adapt to variations of the sampled signal 108 (e.g. associated with the input signal 104) on the timescale associated with a signal frame 204.

The adaptive filter 110 may filter signal frames 204 sequentially or in parallel. For example, each signal frame 204 may be separately processed to filter narrowband interference signals from the signal frame 204. By way of another example, two or more signal frames may be processed in parallel to increase the processing efficiency. In this regard, parallel processing may increase the allowable number of iterations of the recursive filtering element 206 for a given signal frame 204 within the selected latency constraint.

In some embodiments, the signal frame generating element 202 combines the filtered signal frames 204 from the recursive filtering element 206 corresponding to the order in which they are received to provide the filtered signal 112. It is contemplated herein that the processing time associated with the generation of signal frames 204 by the signal frame generating element 202, the operation of one or more iterations of the recursive filtering element 206, and the operation of the signal frame combiner element 210 may be smaller than the selected latency constraint.

The adaptive filter 110 may temporarily store portions of the input signal 104 and/or the sampled signal 108 in memory (e.g. in memory medium 116). For example, the adaptive filter 110 may temporarily store portions of the input signal 104 and/or the sampled signal 108 in memory to provide the filtered signal 112 at a constant data rate that may be, but is not required to be, the same as the data rate of the input signal 104. In some embodiments, the signal frames 204 generated within a specified latency period at the data rate of the input signal 104 are stored (e.g. buffered) in memory. A buffered signal frame 204 may thus be retrieved by the recursive filtering element 206 after a previous signal frame 204 has been processed. Further, filtered signal frames 208 from the recursive filtering element 206 may similarly be stored in memory prior to being combined by the signal frame combiner element 210. In this regard, the number of iterations of the recursive filtering element 206 may vary between signal frames 204, while the output data rate of the filtered signal 112 may remain constant.

It is to be understood that the adaptive filter 110 may be implemented in various manners without departing from the broad scope of the inventive concepts disclosed herein. For example, the signal frame combiner element 210 and/or the signal frame generating element 202 may be implemented as discrete elements rather than integrated with the recursive filtering element 206 as illustrated in FIG. 2. Accordingly, the particular elements associated with the adaptive filter 110 illustrated in FIG. 2 are provided solely for illustrative purposes and should not be interpreted as limiting.

In some embodiments, the recursive filtering element 206 identifies narrowband interference signals from each signal frame 204 in the autocorrelation. It is contemplated herein that the autocorrelation domain may facilitate computationally-efficient detection of narrowband interference signals within the frequency range of the broadband spectrum of the signal frame 204 in applications where the number, the strength, and/or the frequency of potential narrowband interference signals is unknown. An autocorrelation signal, which may be characterized as a correlation of a signal frame 204 with a copy of itself at different time lags, may provide insight into the self-similarity of a signal frame 204. It is further contemplated herein that the presence of one or more high-energy narrowband interference signals within the frequency range of a broadband signal frame 204 will dominate the self-similarity features detectable in the autocorrelation domain.

In some embodiments, each iteration of the recursive filtering element 206 detects whether at least one narrowband interference signal is present in a signal frame 204. In the case that no narrowband interference signals are present, the signal frame 204 may be directly provided as a filtered signal frame 208. In the case that at least one high-energy narrowband interference signal is present, a frequency associated with one of the narrowband interference signals (e.g. a frequency cue) is determined and the signal frame 204 is filtered at the frequency cue to provide the filtered signal frame 208.

In this regard, multiple iterations of the recursive filtering element 206 may recursively identify and filter detected narrowband interference signals from a signal frame 204.

Figure 3:
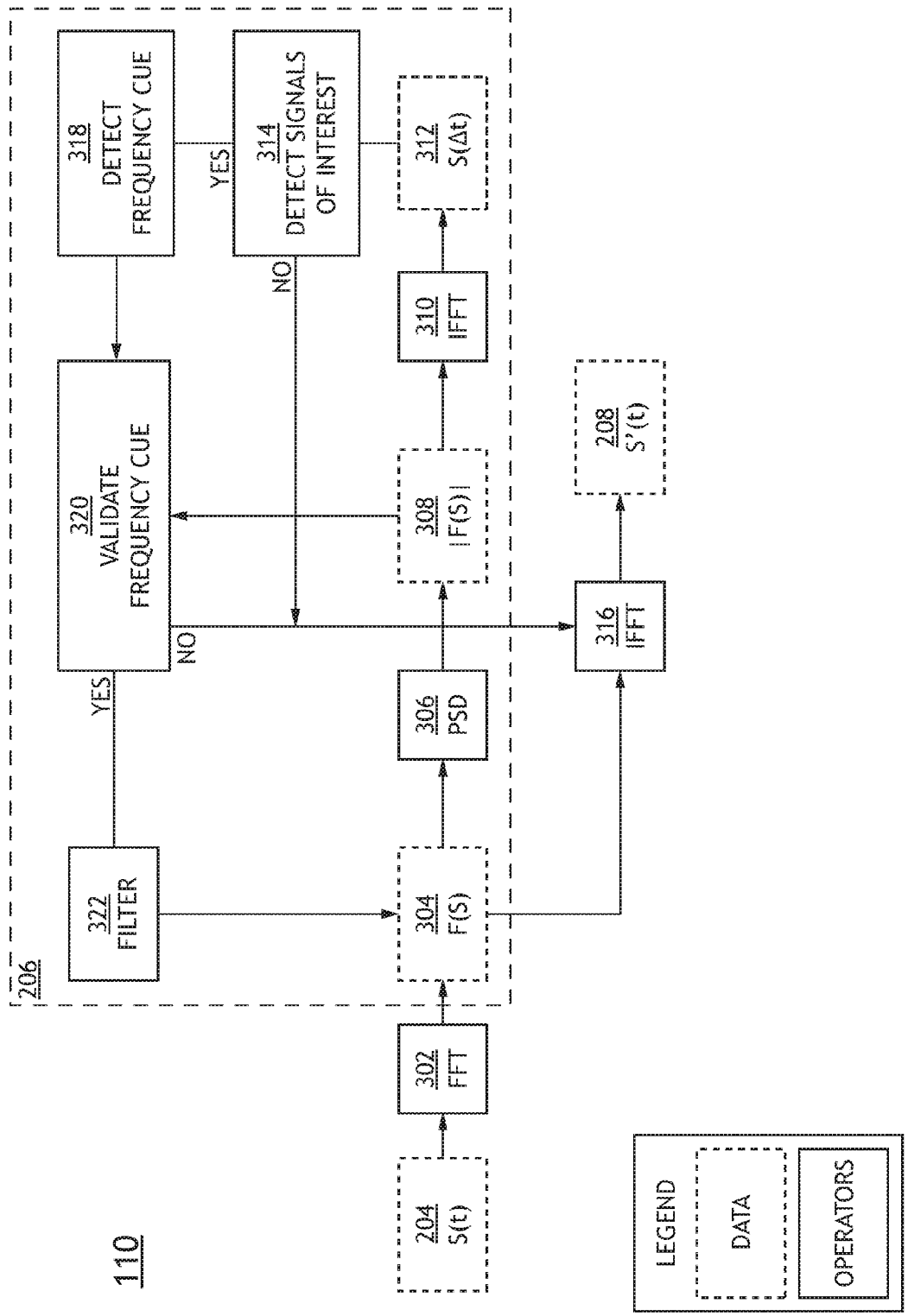
FIG. 3 is a flow diagram depicting an exemplary recursive filtering element of an adaptive filter configured in accordance with an embodiment of the inventive concepts disclosed herein.

Referring now to FIG. 3, a flow diagram depicting an exemplary recursive filtering element 206 of the adaptive filter 110 configured in accordance with an embodiment of the inventive concepts disclosed herein is shown.

The recursive filtering element 206 performs a Fast Fourier Transform (FFT) step 302 to generate a frequency-domain signal frame 304. The recursive filtering element 206 may then perform a power spectral density (PSD) calculation step 306 to generate a PSD signal 308 of the signal frame 204 (e.g. by multiplying each point of the frequency-domain signal frame 304 by its complex conjugate). The recursive filtering element 206 may then perform an Inverse Fast Fourier Transform (IFFT) step 310 to generate an autocorrelation-domain signal frame 312.

It is to be understood that an autocorrelation signal may be generated by various means without departing from the broad scope of the inventive concepts disclosed herein. For example, the autocorrelation-domain signal frame 312 may be generated by multiplying the signal frame 204 with a time-shifted copy of itself at one or more time lags, by generating a convolution of the signal frame 204 with a time-reversed copy of itself, or the like. By way of another example, the autocorrelation-domain signal frame 312 may be generated using any type of Fourier Transform and Inverse Fourier Transform technique such as, but not limited to, a Discrete Fourier Transform (DFT). Further, the autocorrelation-domain signal frame 312 may include any scaling or normalization factors without departing from the broad scope of the inventive concepts disclosed herein.

The autocorrelation-domain signal frame 312 may be, but is not required to be, characterized as a symmetric signal as a function of time lag (e.g. a time lag associated with a cross-correlation of the signal frame 204 with itself). For example, an autocorrelation-domain signal frame 312 corresponding to a signal frame 204 having N points may have 2N−1 points. In this regard, the autocorrelation-domain signal frame 312 may be written as $S_{1-N} \ldots S_0 \ldots S_{N-1}$ and may be symmetric about the $S_0$, which corresponds to a time lag of 0. Accordingly, in some embodiments, the autocorrelation-domain signal frame 312 may be calculated and/or represented as $S_0 \ldots S_{N-1}$.

In some embodiments, the recursive filtering element 206 performs a signal of interest detection step 314 to determine whether one or more signals of interest (e.g. potential narrowband interference signals) are present in the autocorrelation-domain signal frame 312.

The signal of interest detection step 314 may be implemented by various means without departing from the broad scope of the inventive concepts disclosed herein. In some embodiments, the signal of interest detection step 314 includes calculating a ratio of the values of the autocorrelation-domain signal frame 312 at two time lags (e.g. two successive time lags) to detect signals of interest.

For example, the signal of interest detection step 314 may include, but is not required to include, calculating the ratio of the values of $S_1$ to $S_0$ to detect signals of interest. It is contemplated herein that the magnitude of $S_0$, corresponding to a cross-correlation of the signal frame 204 with no time lag (e.g. signal frame 204 pointwise multiplied by itself) may represent the total energy within the signal frame 204 including the energies of the desired signal, any noise, and any narrowband interference signals. The magnitudes of the autocorrelation-domain signal frame 312 corresponding to non-zero time lags (e.g. any of $S_1 \ldots S_{N-1}$) may represent the energy of the signal frame 204, but decorrelated as a function of the time lag.

It is further contemplated herein that the magnitudes of $S_1 \ldots S_{N-1}$ in the signal frame 204 without noise or narrowband interference signals may be expected to have a relatively low correlation (e.g. signal frame 204 is a relatively random signal) such that the magnitudes of $S_1 \ldots S_{N-1}$ of a signal frame 204 may be expected to be low relative to the magnitude of $S_0$. In some cases, the expected autocorrelation-domain signal frame 312 may be well-understood based on the modulation scheme (e.g. MSK) associated such that the ratio of the magnitudes of any points of the autocorrelation-domain signal frame 312 may be predictable. Further, the autocorrelation signal of noise present in the signal frame 204 frame may be similarly well-understood such that the contribution of noise to the ratio of the magnitudes of any of $S_1 \ldots S_{N-1}$ to $S_0$ may be predictable.

It is further contemplated herein that deterministic transmitted signals received with sufficient energy may introduce sufficient correlation that the presence of such signals is detectable by a ratio of some of the magnitudes of $S_1 \ldots S_{N-1}$ to the magnitude of $S_0$. Accordingly, the signal of interest detection step 314 may determine whether or not signals of interest are present in the signal frame 204 by comparing the ratio of the magnitudes of $S_1$ and $S_0$ to a selected signal detection threshold. A ratio higher than the signal detection threshold may thus be indicative of at least one signal of interest present in the signal frame 204, whereas a ratio lower than the signal detection threshold may thus be indicative of a lack of such a signal of interest. In this regard, the value of the signal detection threshold may be selected based on expected contributions of the underlying data signal and/or noise to provide a desired level of performance of the adaptive filter 110. For example, selecting a relatively higher signal detection threshold may reduce the number of detected signals of interest for potential filtering, but may improve processing speed. Similarly, selecting a relatively lower signal detection threshold may increase the number of detected signals of interest for potential filtering to provide a cleaner filtered signal 112 at the expense of processing time, which may be acceptable in applications with a longer latency constraint. Further, the value of the signal detection threshold may be static (e.g. selected prior to operation of the adaptive filter 110) or may be dynamically adjustable (e.g. based on changing signal conditions).

In the case that no signals of interest are detected, the recursive filtering element 206 may perform an output IFFT step 316 of the frequency-domain signal frame 304 to generate the filtered signal frame 208. If no signals of interest are detected during a first iteration of the recursive filtering element 206 for a given signal frame 204, the signal frame 204 may be directly output as the filtered signal frame 208.

In the case that one or more signals of interest are detected, the recursive filtering element 206 may perform a frequency cue detection step 318 to determine at least one frequency of interest associated with a signal of interest (e.g. a potential narrowband interference signal). It is contemplated herein that one or more high-energy narrowband interference signals received with the broadband input signal 104 may introduce sufficient correlation that the presence of such signals may dominate the autocorrelation-domain signal frame 312 (e.g. dominate the complex values of $S_0 \ldots S_{N-1}$). In such cases, the center frequency of the strongest high-energy narrowband interfering signal may be determined based on the energy-weighted average frequency of the signal frame 204.

In some embodiments, the frequency cue detection step 318 includes calculating the energy-weighted average frequency of the signal frame 204 to generate the frequency cue. The energy-weighted average frequency may be, but is not required to be, determined by calculating the ratio of the complex phase difference between successive points of the autocorrelation-domain signal frame 312 and the value of the sampling period (e.g. the time separation between sampled points in the signal frame 204). For example, the energy-weighted average frequency may be calculated as the ratio of the complex phase difference between the magnitudes of $S_1$ and $S_0$ to the sampling period.

In some embodiments, the recursive filtering element 206 may perform one or more validation steps 320 to ensure that the frequency cue is accurate and/or to perform an additional level of verification that narrowband interference signals with sufficient energy to distort and/or mask the underlying data signal in the signal frame 204 are present. For example, it may be the case that the energy-weighted average frequency of the signal frame 204 may be near, but not exactly equal to, the frequency of a narrowband interference signal, particularly when multiple narrowband interference signals are present in the signal frame 204.

A validation step 320 may include a local peak detection step to ensure that the frequency cue generated in the frequency cue detection step 318 is at a local maximum of the PSD signal 308. The local peak detection step may include, but is not required to include, recursively monitoring the slope of the PSD signal 308 calculated between the frequency cue and frequency values immediately adjacent to the frequency cue and adjusting the frequency cue if necessary.

For example, in the case that the slope of the PSD signal 308 associated with the frequency cue and an adjacent lower frequency value (e.g. a preceding slope) is positive and the slope of the PSD signal 308 associated with the frequency cue and an adjacent higher frequency value (e.g. a succeeding slope) is negative, the frequency cue may be at a local maximum. In the case that the preceding slope and the succeeding slope have the same sign, the frequency cue may be adjusted.

The local peak detection step may additionally account for signal variations. For example, in the case that the preceding slope is negative and the succeeding slope is positive, the frequency cue may be at a local minimum and may be adjusted based on the larger of the slopes. The local peak detection step may further include exit conditions such as, but not limited to, the preceding slope and the succeeding slope both being below a threshold value indicating that the frequency cue is on a local maximum, or a maximum deviation of the recursive frequency adjustments beyond an initial value (e.g. the energy-weighted average frequency).

It is to be understood that an autocorrelation signal may be generated by various means without departing from the broad scope of the inventive concepts disclosed herein. In this regard, the previous general description of a recursive local peak detection process is provided merely to illustrate an exemplary computationally-efficient local peak detection step in accordance with inventive steps disclosed herein and should not be interpreted as limiting. For example, the end conditions may be empirically determined prior to operation of the adaptive filter 110 or dynamically during the operation of the adaptive filter 110. Further, any local peak detection technique suitable for efficiently determining a frequency proximate to the frequency cue generated in the frequency cue detection step 318 located at a local peak may be utilized within the broad scope of the inventive concepts disclosed herein.

In some embodiments, a validation step 320 may include a comparison of a variance of the PSD signal 308 in a window surrounding the frequency cue (e.g. as generated by the frequency cue detection step 318 or as adjusted by a local peak detection step) to a selected variance threshold value. It is contemplated herein that the variance of the PSD signal 308 surrounding a frequency cue of interest may be utilized to distinguish between narrowband interference signals and variations in the PSD of the desired broadband signal frame 204 (e.g. associated with noise combined with the underlying data signal).

In this regard, a variance greater than the selected variance threshold may indicate that the frequency cue is not associated with a narrowband interference signal and therefore should not be filtered. It is further contemplated herein that the presence of a narrowband interference signal may detectably decrease the variance within the selected window. Accordingly, if the variance is greater than the selected variance threshold, the recursive filtering element 206 may perform the output IFFT step 316 to provide the signal frame 204 as the filtered signal frame 208. If no narrowband interference signals are detected during a first iteration of the recursive filtering element 206 for a given signal frame 204, the signal frame 204 may be directly output as the filtered signal frame 208. Further, a variance lower than the selected variance threshold may indicate that the frequency cue is associated with a narrowband interference signal suitable for filtering.

The window size associated with the variance calculation may be any size suitable for discriminating between the presence of a narrowband interference signal at the frequency cue and expected variations of the PSD signal 308. For example, the window size may be, but is not required to be, N/4+1 points, where N is the number of points in the PSD signal 308. In the case that a selected window size centered on the frequency cue would extend beyond the data range of the PSD signal 308, the window may be shifted to fit within the data range of the PSD signal 308 and/or the window size may be reduced.

In the case that the amplitude of a spectral line of the PSD signal 308 near (e.g. adjacent to) the frequency cue is larger than the amplitude at the frequency cue and the variance is below the selected variance threshold, the value of the frequency cue may be adjusted. For example, the frequency associated with the spectral line with the larger amplitude may be set to frequency cue and a local peak detection step may be used to ensure that the frequency cue is associated with a local maximum of the PSD signal 308.

In the case that a narrowband interference signal is detected (e.g. by the signal of interest detection step 314 step and/or any validation steps 320), the recursive filtering element 206 may perform a filtering step 322.

In some embodiments, the filtering step 322 includes zeroing out the values (e.g. the complex voltage values) of the frequency-domain signal frame 304 at the determined frequency value of the narrowband interference signal (e.g. replacing the initially-calculated complex values with 0+j0).

In some embodiments, the filtering step 322 includes changing the complex value of the frequency-domain signal frame 304 at the determined frequency value of the narrowband interference signal to an average of the complex values the frequencies immediately above and below the determined frequency value of the narrowband interference signal.

In some embodiments, the filtering step 322 includes replacing the value of the frequency-domain signal frame 304 at the determined frequency value of the narrowband interference signal with a value from a template of the expected frequency-domain signal frame for the baseband signal. For example, a representative signal frame (e.g. including representative data) having the same number of samples as the signal frame 204 may be processed to provide the template frequency-domain signal frame. Additionally, the template frequency-domain signal frame may be normalized to the frequency-domain signal frame 304. The template frequency-domain signal frame may be, but is not required to be, normalized to the frequency-domain signal frame 304 based on reducing error between the template frequency-domain signal frame and the frequency-domain signal frame 304 excluding the magnitude value at the determined frequency of the narrowband interference signal. For instance, the template frequency-domain signal frame may be normalized such that a least-squares error (or other error metric) for all magnitude values except the magnitude value at the determined frequency of the narrowband interference signal is below a selected threshold.

Further, the complex value of the frequency-domain signal frame 304 at the determined frequency of the narrowband interference signal may be replaced by the corresponding complex value of the template frequency-domain signal frame. Accordingly, it is to be understood that the filtering step 322 may remove the narrowband interference signal using a variety of means without departing from the broad scope of the inventive concepts disclosed herein.

The recursive filtering element 206 may then perform the output IFFT step 316 on the result of the filtering step 322 to provide the filtered signal frame 208. Accordingly, as described previously herein, the output IFFT step 316 may be performed at multiple points during an iteration of the recursive filtering element 206 such as, but not limited to, a lack of signals of interest detected by the signal of interest detection step 314, a lack of a valid narrowband interference signal as a result of the validation step 320, or after a predetermined latency constraint has been reached.

Further, the adaptive filter 110 may perform any desired number of iterations of the recursive filtering element 206 within the selected latency constraint to remove any number of narrowband interference signals. In the case that iterations of the recursive filtering element 206 remove all identified narrowband interference signals in a length of time shorter than the latency constraint, the adaptive filter 110 may move to a subsequent signal frame 204. However, the number of iterations of the recursive filtering element 206 may need to be limited by a termination condition to ensure that the processing time does not exceed the selected latency constraint. In some embodiments, the termination condition includes a fixed maximum number of iterations. In some embodiments, the recursive filtering element 206 may be allowed to iterate any number of times within a selected timeframe smaller than the latency requirement.

Figure 4:
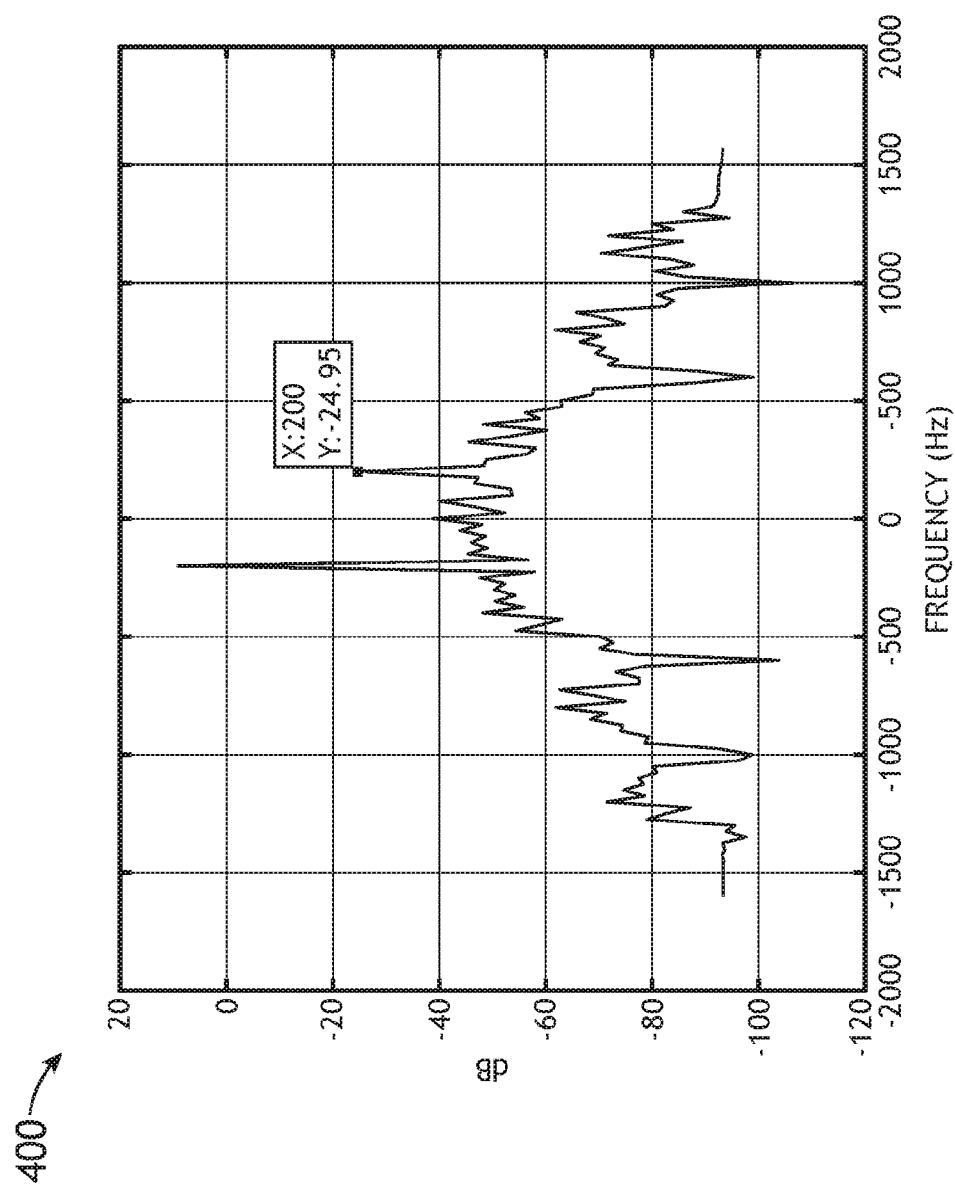
FIG. 4 is a plot of a PSD signal associated with an exemplary signal frame that includes two narrowband interference signals located at +/−200 Hz from the center frequency in accordance with an embodiment of the inventive concepts disclosed herein.
Figure 5:
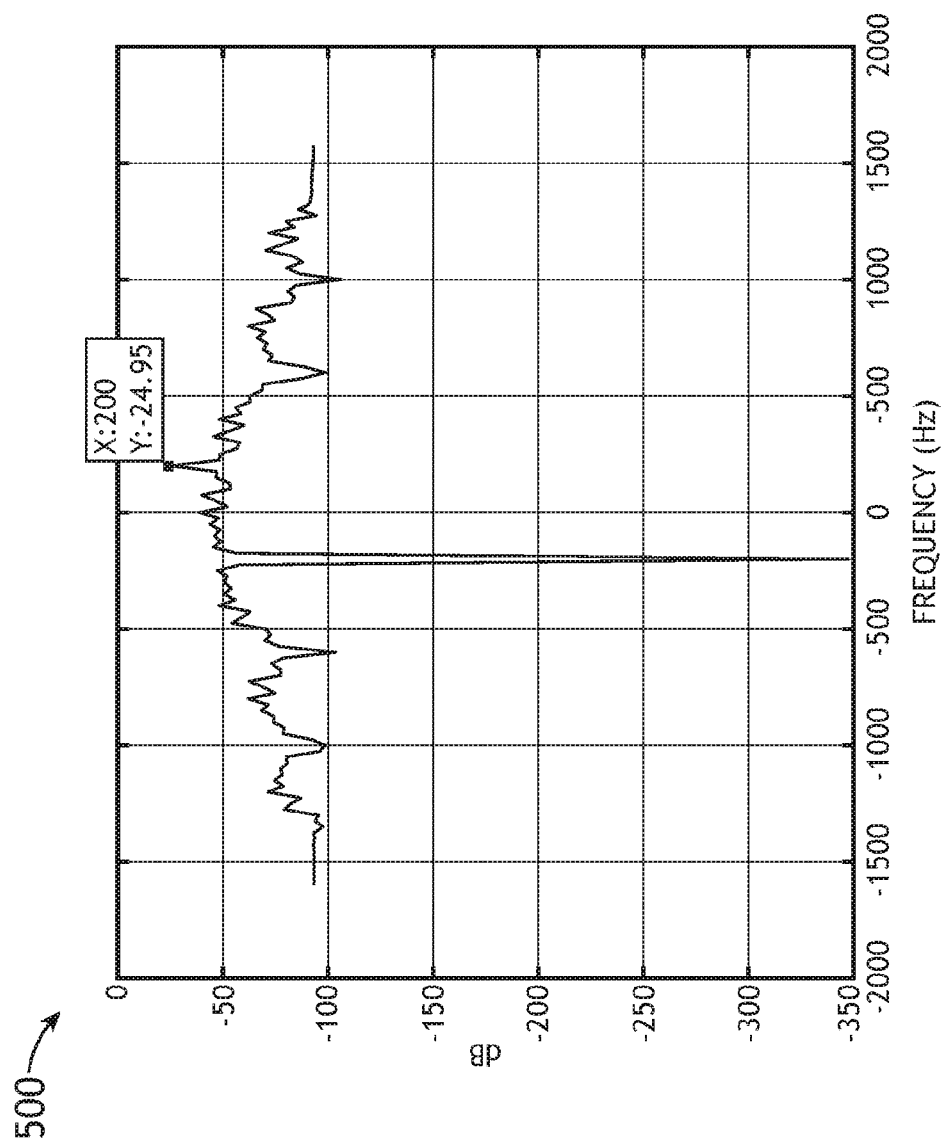
FIG. 5 is a plot indicating a filtered signal frame corresponding to the PSD signal of FIG. 4 after a first iteration of a recursive filtering element in accordance with an embodiment of the inventive concepts disclosed herein.
Figure 6:
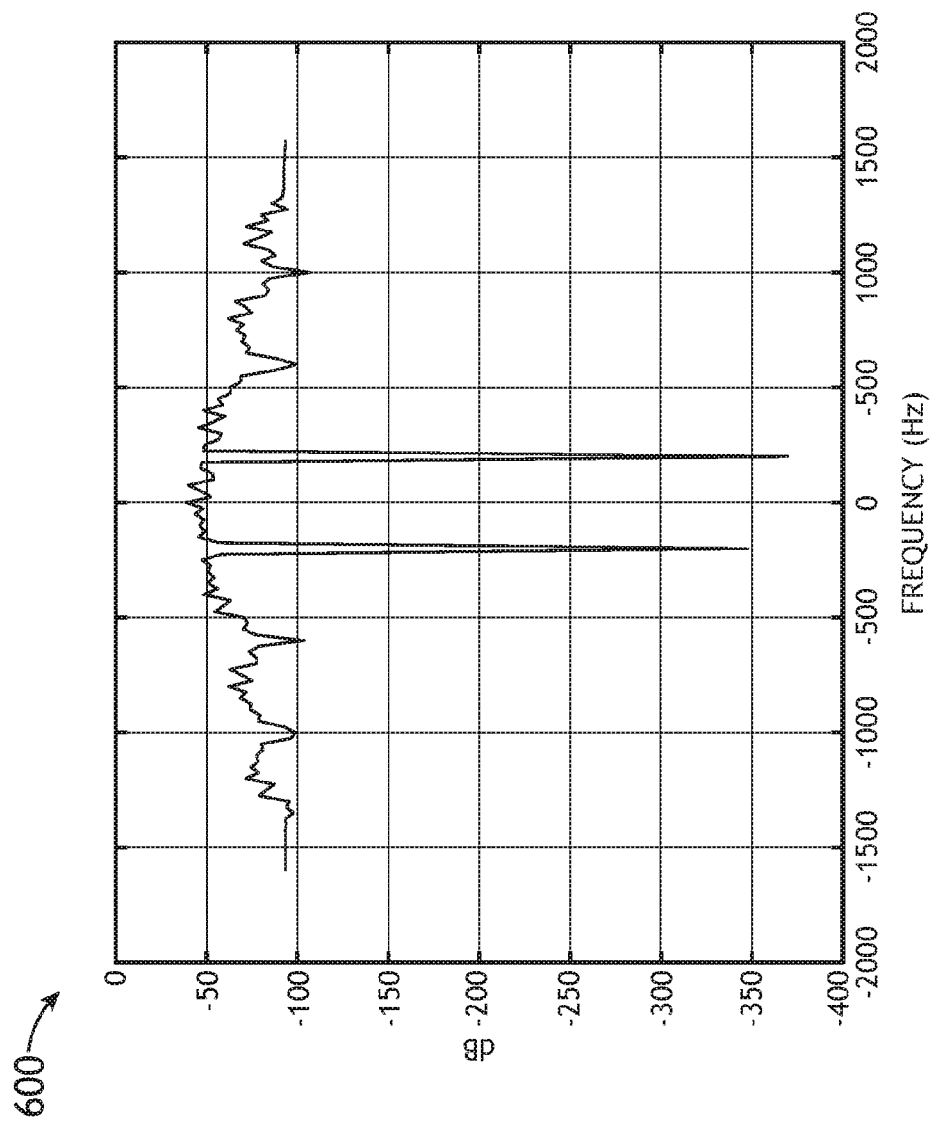
FIG. 6 is a plot indicating a filtered signal frame corresponding to the PSD signal of FIG. 5 after a second iteration of a recursive filtering element in accordance with an embodiment of the inventive concepts disclosed herein.

Referring now to FIGS. 4-6, plots indicating the recursive filtering of two narrowband interference signals from an input signal frame in accordance with an embodiment of the inventive concepts disclosed herein are shown. FIG. 4 includes a plot 400 of a PSD signal (e.g. PSD signal 308) associated with an exemplary signal frame (e.g. signal frame 204) that includes two narrowband interference signals located at +/−200 Hz from the center frequency (0 Hz in FIG. 4). The narrowband interference signals have different spectral amplitudes, both of which are larger than the spectral amplitude of the underlying data signal combined with noise.

Referring now to FIG. 5, a plot 500 indicating a filtered signal frame corresponding to the PSD signal of FIG. 4 after a first iteration of the recursive filtering element 206 in accordance with an embodiment of the inventive concepts disclosed herein is shown. For example, the first iteration of the recursive filtering element 206 may identify (e.g. using the signal of interest detection step 314 and/or any validation steps 320) the narrowband interference signal located at −200 Hz in FIG. 4. Further, the first iteration of the recursive filtering element 206 may zero out the input signal frame (e.g. using the filtering step 322) at the identified frequency of −200 Hz, which is indicated in the plot 500 as a dip in the amplitude at the frequency of −200 Hz.

Referring now to FIG. 6, a plot 600 indicating a filtered signal frame corresponding to the PSD signal of FIG. 5 after a second iteration of the recursive filtering element 206 in accordance with an embodiment of the inventive concepts disclosed herein is shown. For example, the second iteration of the recursive filtering element 206 operating on the signal frame 204 as modified by the first iteration may identify the narrowband interference signal located at +200 Hz in FIGS. 4-5. Further, the second iteration of the recursive filtering element 206 may zero out the input signal frame (e.g. using the filtering step 322) at the identified frequency of +200 Hz, which is indicated in the plot 600 as a dip in the amplitude at the frequency of +200 Hz.

In some embodiments, though not shown, additional filtering techniques as described previously herein may be utilized to identify and filter the identified narrowband interference signals at +/−200 Hz.

Figure 7:
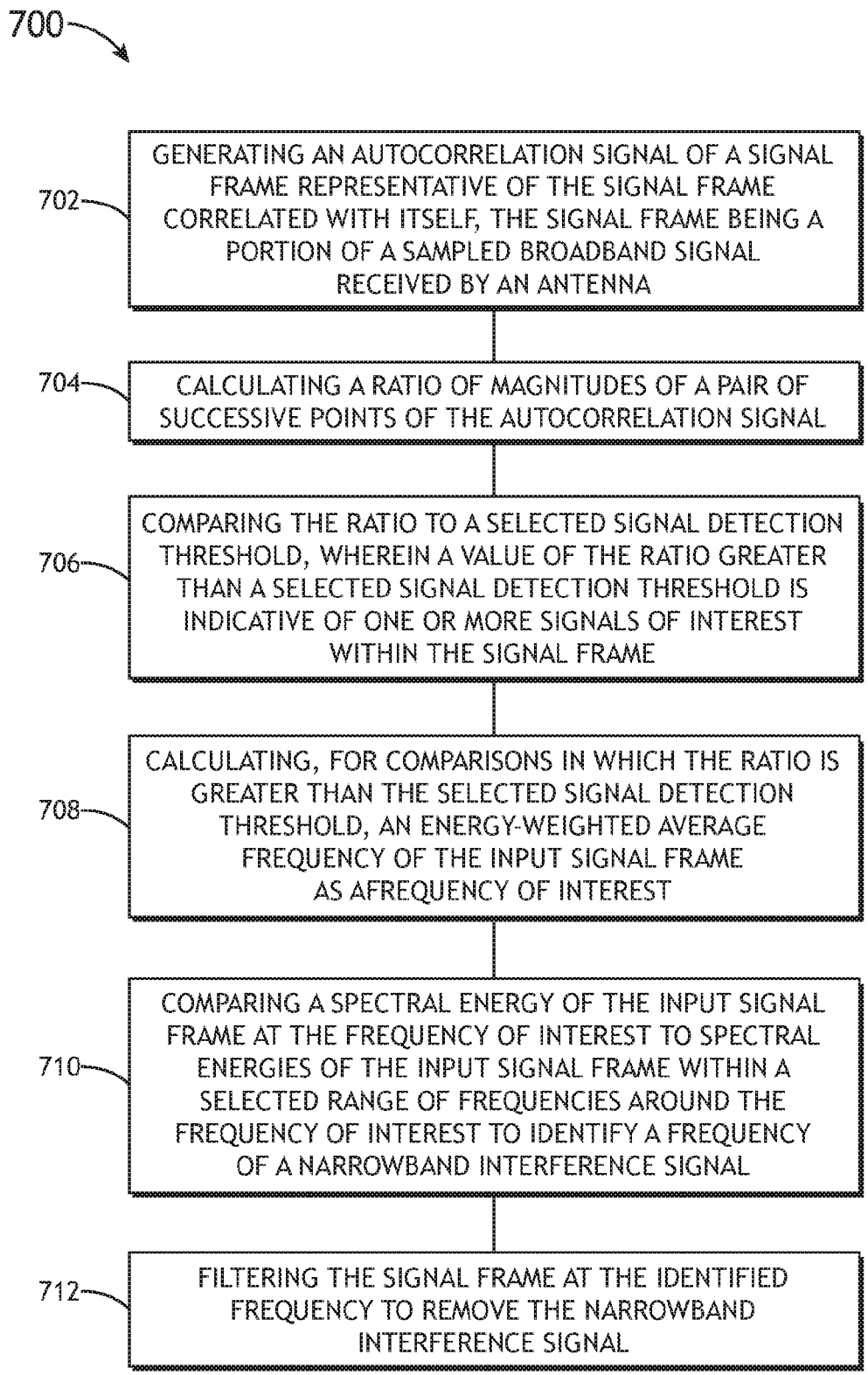
FIG. 7 is a flow diagram depicting an exemplary embodiment of a method according to the inventive concepts disclosed herein.

Referring now to FIG. 7, an exemplary embodiment of a method 700 according to the inventive concepts disclosed herein may include one or more of the following steps. The method 700 may be utilized to recursively filter narrowband interference signals from a broadband signal. The embodiments and enabling technologies described previously herein in the context of the RF system 100 should be interpreted to extend to method 700. However, the method 700 is not limited to the architecture of the RF system 100.

A step 702 of method 700 may include generating an autocorrelation signal of a signal frame representative of the signal frame correlated with itself in which the signal frame corresponds to a portion of a sampled broadband signal received by an antenna (e.g. antenna 102). The autocorrelation signal may be generated using any means. In some embodiments, the autocorrelation signal is generated by performing a FFT of the signal frame, performing a PSD calculation on the FFT signal, and performing an IFFT of the PSD. Further, magnitudes of the autocorrelation signal may be generated by point by point multiplication of the IFFT signal by its complex conjugate. In some embodiments, the autocorrelation signal is generated by performing a cross-correlation of the signal frame with itself at two or more time lags.

A step 704 of method 700 may include calculating a ratio of magnitudes of a pair of successive points of the autocorrelation signal. A step 706 of method 700 may include comparing the ratio to a selected signal detection threshold in which a value of the ratio greater than a selected signal detection threshold is indicative of signals of interest within the signal frame. In this regard, signals of interest may be associated with the presence of an unknown number of narrowband interference signals with unknown frequencies and unknown signal strengths. For example, step 704 may include calculating the ratio of the magnitude of a point of the autocorrelation signal corresponding to a time lag of the period of the data sampling function to a point of the autocorrelation signal corresponding to a time lag of zero.

A step 708 of method 700 may include calculating, for comparisons in which the ratio is greater than the selected signal detection threshold, an energy-weighted average frequency of the input signal frame as a frequency of interest (e.g. a frequency corresponding to a signal of interest). In some embodiments, the frequency of interest may be identified by calculating a complex phase difference between successive points of the autocorrelation signal and dividing the complex phase difference by the sampling period of the input signal frame.

A step 710 of method 700 may include comparing a spectral energy of the input signal frame at the frequency of interest to spectral energies of the input signal frame within a selected range of frequencies around the frequency of interest to identify a frequency of a narrowband interference signal. Step 710 may thus include validating whether the frequency of interest corresponds to a narrowband interference signal. For example, step 710 may include performing a local peak detection step to ensure that the frequency of interest corresponds to a local maximum of a PSD of the input signal frame. By way of another example, step 710 may include calculating a variance of the PSD of the input signal frame within a range of frequencies surrounding the frequency of interest. In this regard, a variance lower than a selected variance threshold may indicate that the frequency of interest corresponds to a narrowband interference signal.

A step 712 of method 700 may include filtering the signal frame at the identified frequency to remove the narrowband interference signal. The signal frame may be filtered in a variety of means without departing from the broad scope of the inventive concepts disclosed herein. For example, the signal frame may be filtered by zeroing out frequency components from the signal frame at the identified frequency, by replacing the value of a frequency-domain signal frame (e.g. generated by an FFT of the signal frame) at the identified frequency with an average value of adjacent frequencies, or by replacing value of the frequency-domain signal frame with a value from a pre-calculated template frequency-domain signal frame.

Further, the steps of the method 700 may be recursively applied (e.g. in one or more iterations) to any signal frame of a signal (e.g. sampled signal 108) to recursively filter out narrowband signals from the signal frame. Further, the number of iterations of the method 700 may be limited such that the processing time is shorter than a selected limit. For example, the selected limit may be chosen to be equal to or smaller than a selected latency constraint such that narrowband signals may be filtered from the signal frame within the selected latency constraint.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. An adaptive filter for recursively filtering interference signals comprising:
    a filtering device including one or more processors configured to execute program instructions configured to cause the one or more processors to iteratively filter each of one or more signal frames corresponding to portions of a broadband signal to remove narrowband interference signals, an iteration comprising:

generating an autocorrelation signal of an input signal frame representative of the input signal frame correlated with itself, the input signal frame being one of the one or more signal frames;

calculating a ratio of magnitudes of a pair of successive points of the autocorrelation signal;

comparing the ratio to a selected signal detection threshold, wherein a value of the ratio greater than the selected signal detection threshold is indicative of one or more signals of interest within the input signal frame;

calculating, for comparisons in which the ratio is greater than the selected signal detection threshold, an energy-weighted average frequency of the input signal frame as a frequency of interest;

comparing a spectral energy of the input signal frame at the frequency of interest to spectral energies of the input signal frame within a selected range of frequencies around the frequency of interest to identify a frequency of a narrowband interference signal of the narrowband interference signals; and filtering the input signal frame at the identified frequency to remove the narrowband interference signal.

2. The adaptive filter of claim 1, wherein the pair of successive points of the autocorrelation signal comprises:

a point of the autocorrelation signal corresponding to a time lag of zero; and a point of the autocorrelation signal corresponding to a time lag equal to a sampling period of the input signal frame.

3. The adaptive filter of claim 1, wherein calculating the energy-weighted average frequency of the input signal frame as the frequency of interest comprises:

calculating a phase difference between the pair of successive points of the autocorrelation signal; and dividing the phase difference by a sampling period of the input signal frame to determine the frequency of interest.

4. The adaptive filter of claim 1, wherein the iteration of the filtering device further comprises:

generating a frequency-domain signal by performing a Fourier transform of the input signal frame.

5. The adaptive filter of claim 4, wherein the iteration of the filtering device further comprises:

generating a power spectral density signal associated with the frequency-domain signal.

6. The adaptive filter of claim 5, wherein generating the autocorrelation signal of the input signal frame comprises:

performing an inverse Fourier transform of the power spectral density signal.

7. The adaptive filter of claim 5, further comprising:

adjusting, prior to filtering the input signal frame at the identified frequency to remove the narrowband interference signal, the frequency of interest to a frequency corresponding to a local maximum of the power spectral density signal within a selected range of frequencies around the frequency of interest.

8. The adaptive filter of claim 5, wherein the iteration of the filtering device further comprises:

comparing a variance of the power spectral density signal in a selected range of frequencies around the frequency of interest to a selected variance threshold, wherein filtering the input signal frame at the identified frequency comprises:

filtering, for comparisons in which both the ratio is greater than the selected signal detection threshold and the variance is smaller than the selected variance threshold, the input signal frame at the identified frequency to remove the narrowband interference signal.

9. The adaptive filter of claim 4, wherein filtering the input signal frame at the identified frequency of the narrowband interference signal comprises:

zeroing out a complex value of the frequency-domain signal at the identified frequency.

10. The adaptive filter of claim 4, wherein filtering the input signal frame at the identified frequency of the narrowband interference signal comprises:

changing a complex value of the frequency-domain signal at the identified frequency to an average of the complex values of the frequency-domain signal at a frequency immediately above the identified frequency and a frequency immediately below the identified frequency.

11. The adaptive filter of claim 4, wherein filtering the input signal frame at the identified frequency of the narrowband interference signal comprises:

retrieving a template frequency-domain signal generated using a same number of samples as the frequency-domain signal;

normalizing the template frequency-domain signal to the frequency-domain signal based on an error metric; and changing a complex value of the frequency-domain signal at the identified frequency to a corresponding complex value of the normalized template frequency-domain signal at the identified frequency.

12. The adaptive filter of claim 11, wherein the error metric comprises:

a least-squares error between the template frequency-domain signal and the frequency-domain signal.

13. The adaptive filter of claim 1, wherein the filtering device is configured to remove the narrowband interference signals within a selected latency specification by limiting a number of iterations of the filtering device.

14. A system for recursively filtering interference signals comprising:

an antenna;

an analog-to-digital converter configured to receive a broadband signal from the antenna, the analog-to-digital converter further configured to sample the broadband signal; and a filtering device including one or more processors configured to execute program instructions configured to cause the one or more processors to iteratively filter each of one or more signal frames of the sampled broadband signal to remove narrowband interference signals, an iteration comprising:

generating an autocorrelation signal of an input signal frame representative of the input signal frame correlated with itself, the input signal frame being one of the one or more signal frames;

calculating a ratio of magnitudes of a pair of successive points of the autocorrelation signal;

comparing the ratio to a selected signal detection threshold, wherein a value of the ratio greater than the selected signal detection threshold is indicative of one or more signals of interest within the input signal frame;

calculating, for comparisons in which the ratio is greater than the selected signal detection threshold, an energy-weighted average frequency of the input signal frame as a frequency of interest;

comparing a spectral energy of the input signal frame at the frequency of interest to spectral energies of the input signal frame within a selected range of frequencies around the frequency of interest to identify a frequency of a narrowband interference signal of the narrowband interference signals; and filtering the input signal frame at the identified frequency to remove the narrowband interference signal.

15. The system of claim 14, wherein the filtering device is configured to remove the narrowband interference signals within a selected latency specification by limiting a number of iterations of the filtering device.

16. The system of claim 15, wherein the selected latency specification corresponds to a time difference between receiving of a portion of the broadband signal from the antenna and completing one or more iterations of the filtering device to provide a filtered input signal frame.

17. The system of claim 14, wherein the pair of successive points of the autocorrelation signal comprises:
   a point of the autocorrelation signal corresponding to a time lag of zero; and
   a point of the autocorrelation signal corresponding to a time lag equal to a sampling period of the input signal frame.

18. The system of claim 14, wherein calculating the energy-weighted average frequency of the input signal frame as the frequency of interest comprises:
   calculating a phase difference between the pair of successive points of the autocorrelation signal; and
   dividing the phase difference by a sampling period of the input signal frame to determine the frequency of interest.

19. A method for recursively filtering interference signals comprising:
   generating an autocorrelation signal of a signal frame representative of the signal frame correlated with itself, the signal frame being a portion of a sampled broadband signal received by an antenna;
   calculating a ratio of magnitudes of a pair of successive points of the autocorrelation signal;
   comparing the ratio to a selected signal detection threshold, wherein a value of the ratio greater than the selected signal detection threshold is indicative of one or more signals of interest within the signal frame;
   calculating, for comparisons in which the ratio is greater than the selected signal detection threshold, an energy-weighted average frequency of the input signal frame as a frequency of interest;
   comparing a spectral energy of the input signal frame at the frequency of interest to spectral energies of the input signal frame within a selected range of frequencies around the frequency of interest to identify a frequency of a narrowband interference signal; and
   filtering the signal frame at the identified frequency to remove the narrowband interference signal.

20. The method of claim 19, wherein the pair of successive points of the autocorrelation signal comprises:
   a point of the autocorrelation signal corresponding to a time lag of zero; and
   a point of the autocorrelation signal corresponding to a time lag equal to a sampling period of the input signal frame, wherein calculating the energy-weighted average frequency of the input signal frame as the frequency of interest comprises:
   calculating a phase difference between the pair of successive points of the autocorrelation signal; and
   dividing the phase difference by the sampling period to determine the frequency of interest.

* * * * *